United States Patent
Trautmann et al.

(10) Patent No.: US 7,165,754 B2
(45) Date of Patent: Jan. 23, 2007

(54) ELECTROMAGNETIC VALVE

(75) Inventors: Frank Trautmann, Königstein (DE); Dirk Dobberan, Oberursel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 19 days.

(21) Appl. No.: 10/525,915

(22) PCT Filed: Aug. 4, 2003

(86) PCT No.: PCT/EP03/08612

§ 371 (c)(1),
(2), (4) Date: Feb. 25, 2005

(87) PCT Pub. No.: WO2004/020263

PCT Pub. Date: Mar. 11, 2004

(65) Prior Publication Data

US 2006/0163511 A1    Jul. 27, 2006

(30) Foreign Application Priority Data

Aug. 27, 2002 (DE) ............................. 102 39 124
Jan. 9, 2003 (DE) ............................. 103 00 414

(51) Int. Cl.
*F16K 31/02* (2006.01)

(52) U.S. Cl. .......................... 251/129.05; 251/129.02; 137/242

(58) Field of Classification Search ........... 251/129.02, 251/129.05; 137/242
See application file for complete search history.

(56) References Cited

U.S. PATENT DOCUMENTS

| 4,538,228 | A | | 8/1985 | Brearey et al. |
| 6,092,781 | A | * | 7/2000 | Hohl et al. ............. 251/129.02 |
| 6,170,506 | B1 | * | 1/2001 | Butwin et al. ............. 137/2 |

FOREIGN PATENT DOCUMENTS

| DE | 196 53 895 A1 | 6/1998 |
| DE | 199 46 348 A1 | 3/2001 |
| DE | 100 33 909 A1 | 1/2002 |
| WO | WO 01/36243 A1 | 5/2001 |

* cited by examiner

*Primary Examiner*—Edward K. Look
*Assistant Examiner*—John K. Fristoe, Jr.
(74) *Attorney, Agent, or Firm*—RatnerPrestia

(57) ABSTRACT

The invention relates to an electromagnetic valve, the valve coil of which is actuatable by an electric current for removing deposits at the valve seat and the valve closure member in such a manner that the valve closure member impinges upon the valve seat with a defined impulse force.

9 Claims, 1 Drawing Sheet

ELECTROMAGNETIC VALVE

TECHNICAL FIELD

Figure 1:
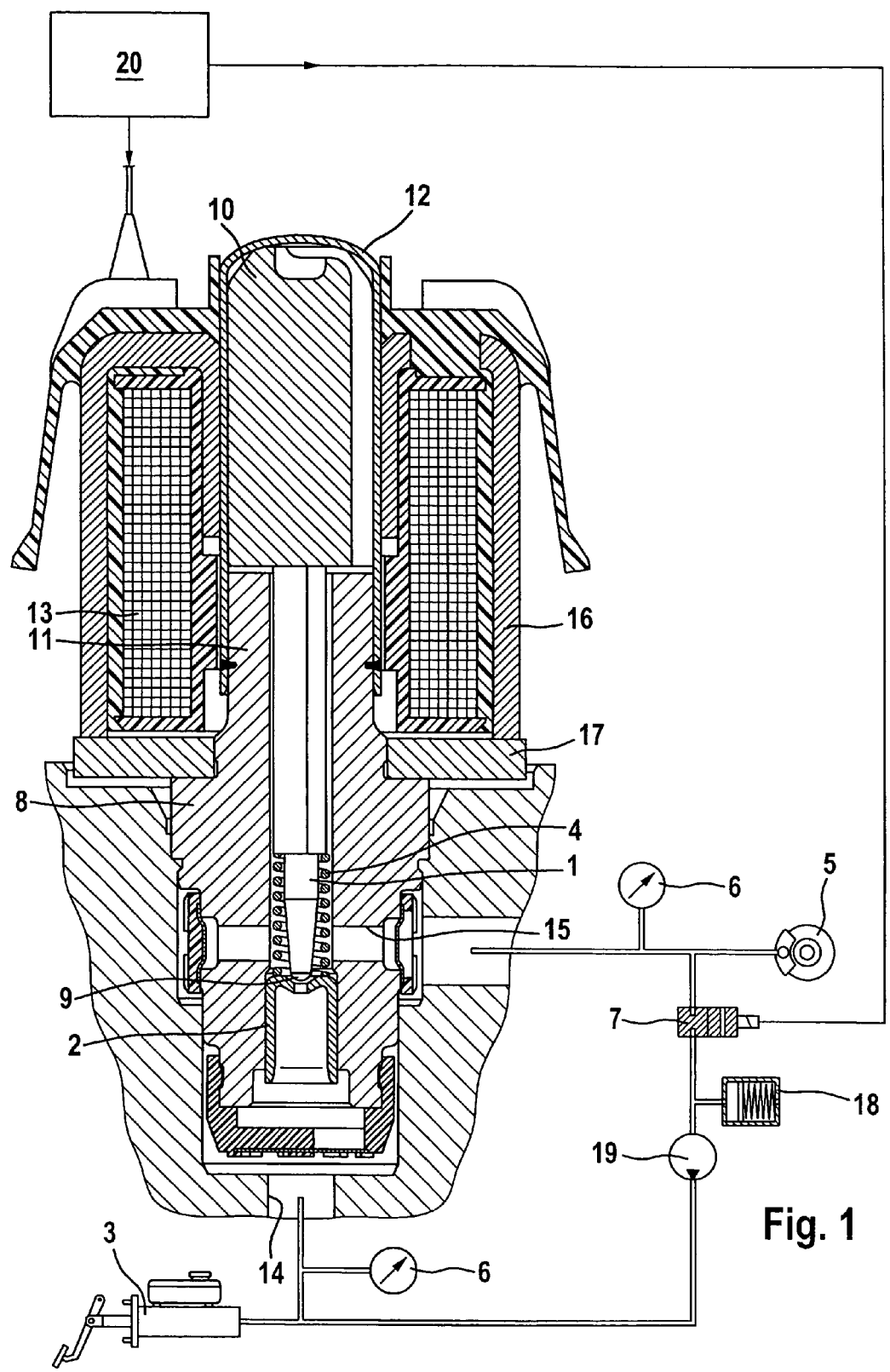

The present invention relates to an electromagnetic valve.

BACKGROUND OF THE INVENTION

Proportionalized electromagnetic valves are known in the art which, in contrast to conventional electromagnetic valves of binary operation, are not actuated pulse-like but exhibit a damped continuous movement of the valve closure member, without generally utilizing the structurally possible total stroke of the valve closure member. Due to this well dosed proportional operation, which is adjusted to be 'soft' under control technology aspects, it cannot be ruled out that contaminants will gather in the area of the valve seat and the valve closure member and impair, under certain circumstances, both the operation of the electromagnetic valve and the system connected thereto. DE 196 538 95 A1, for example, describes an electromagnetic valve of the proportional type of construction.

DETAILED DESCRIPTION OF THE PREFERRED EMBODIMENT

In view of the above, an object of the invention is to improve a proportionally actuated electromagnetic valve of the generic type in such a fashion that the above-mentioned disadvantages are avoided, while maintaining a design as simple as possible.

FIG. 1 shows a total view of a proportionally actuatable electromagnetic valve, which is normally open in its basic position and configured as a two-way seat valve, with a cartridge-type valve housing 8 including a spherical valve closure member 9 at a stepped valve tappet 1. The valve tappet 1 contacts a cylindrical magnet armature 10 on the opposite frontal end of the valve closure member 9. Valve closure member 9 points to a tubular valve seat 2, while the magnet armature 10 faces the magnet core 11 integrated in the valve housing 8. Secured to the magnet core 11 is a preferably deepdrawn sleeve 12 in which the magnet armature 10 can align and move axially. A valve coil 13 is arranged at the periphery of sleeve 12, embedded between a yoke-type sheet 16 and a magnet end plate 17.

During energization of the valve coil 13, the magnet armature 10 moves in a per se known manner in the direction of the magnet core 11 so that the valve closure member 9 shaped at the valve tappet 1 will continuously decrease the pressure fluid connection that is open in the basic position between a pressure-fluid inlet channel and a pressure-fluid outlet channel 14, 15, in opposition to the effect of a valve spring 4 interposed between the valve tappet 1 and the valve seat 2.

To be able to maintain a proportional control, the embodiment at issue requires a defined geometrical dimensioning of the valve seat member 2 and the valve tappet 1. To this end, the valve closure member 9 at the valve tappet 1 has a preferably ball-shaped contour with a diameter of 1.8 to 2.2 mm. This corresponds to a sealing diameter at the valve seat of 0.9 to 1.1 mm. The valve seat angle amounts to 120 degrees. Therefore, it is of special importance to maintain the above-mentioned dimensions and the cleanliness of the components.

The electromagnetic valve is provided as an inlet valve for use in slip-controlled motor vehicle brake systems. In the basic position, its valve closure member 9 is lifted from the valve seat member 2 by means of the valve spring 4 interposed between the valve tappet 1 and the valve seat member 2.

In this arrangement, the special feature involves that for reducing or even avoiding deposits at the valve seat 2 and at the valve closure member 9, the valve coil 13 can be actuated by an electric current in such a manner that the valve closure member 9 will impinge upon the valve seat 2 with an adequately high impulse force beyond the proportional actuation. To this end, it is necessary to rate the power of the electric current such that the valve closure member 9 impulse-like performs its maximum stroke and impinges with a corresponding strength upon the valve seat 2.

To remove contaminants deposited at the valve closure member 9 and at the valve seat 2, the power of the electric current is selected in response to the degree of contamination, i.e. mainly according to the quantity of deposits taking effect on the pressure variation inside the valve. To remove sediments from the valve seat 2 and/or the valve closure member 9, a sufficient rate of current is applied to the valve coil 9 in time intervals when proportional valve actuation does not take place, said current making the normally inactive valve closure member 9 impinge continuously or discontinuously upon the valve seat 2 with an impulse force destroying the deposits. This measure is especially effective when the fluid pressure at the valve closure member 9 is at a minimum so that with least hydraulic resistance, the valve closure member 9 will impinge with the maximum stroke and the maximum speed upon the valve seat 2. Even most persistent sediments can be stripped this way from the valve seat 2 and the valve closure member 9 and, if necessary, removed even by repeating the above-described measure several times.

Stripped sediments can best be rinsed out of the area of valve seat 2 and valve closure member 9 in times when the fluid pressure in the valve is at a maximum. For the purpose of an optimal rinsing effect, the valve closure member 9 has then been switched to assume a position in which it releases the maximum opening cross-section of the valve.

To remove the deposits at the valve seat 2 and/or at the valve closure member 9, the magnet coil 13 is actuated with the impulse force stripping off the sediments at the latest when a leakage occurs in the valve's closed position. To detect the valve leakage between the valve seat 2 and the valve closure member 9, a means is provided detecting in the closed valve position the pressure of the fluid upstream and downstream of the valve closure member 9 or valve seat 2, respectively. A pressure change representative of the valve leakage can be concluded from the measured hydraulic pressure. As a measurement means, pressure sensors 6 are arranged upstream and downstream of the valve closure member 9, said sensors being connected to an electronic controller 20 actuating the valve coil 13 for the purpose of evaluating the pressure sensor signals representative of the pressure change at the valve closure member 9. A pressure model is stored in the electronic controller 20, permitting a comparison of the nominal pressure with the allowable pressure difference due to the contamination of the valve, to what end the controller 20 is equipped with an appropriate evaluating circuit.

A tandem master cylinder is connected as a braking pressure generator 3 to the pressure fluid inlet channel 14 of the electromagnetic valve illustrated in FIG. 1. The pressure fluid outlet channel 15 of the electromagnetic valve is connected to a wheel brake 5 at the level of the valve spring 4. Connected to the said pressure fluid connection leading to wheel brake 5 is a return conduit accommodating an outlet valve 7 and being equipped with a low-pressure accumulator 18 and a pump 19 according to the return delivery principle. The return conduit is connected to the pressure fluid inlet channel 14. The hydraulic circuit shown is of principal nature and serves for a general explanation. Modifications are possible.

Based on the electrically non-energized condition of the valve coil 13 in which the electromagnetic valve is initially opened completely according to the drawing, the electromagnetic valve is principally operated in a brake pressure control by way of a proportional or analog actuation method programmed in controller 20 so that it sensitively releases the respectively desired valve cross-section by means of different control currents for the purpose of pressure metering.

According to the diagrammatic view, the electromagnetic valve is inserted into a braking pressure conduit connecting the braking pressure generator 3 to the wheel brake 5 in a slip-controlled motor vehicle brake system so that as an alternative of pressure sensing by means of pressure sensors 6, the valve leakage can be detected, using an appropriate software, by way of a corresponding pressure model in the controller 20. The pressure model takes into account the pressure variation in the wheel brake 5 and in the braking pressure generator 3 that is changed due to the leakage. Under defined conditions, the use of a pressure model obviates the need for pressure sensors.

The pressure model representative of the changed pressure variation in the wheel brake 5 is calculated in response to vehicle-related and brake-related parameters. Among these is data regarding the vehicle deceleration, the initial pressure in the braking pressure generator, and the braking-pressure increase and braking-pressure decrease characteristics in dependence on the signs of deposits in the valve. For example, the pressure model, among others, takes into account the change of the braking pressure increase gradient in the case of deposits in the valve.

Although the invention has been illustrated so far merely by way of a proportional electromagnetic valve opened in the basic position, the statements made with respect hereto are also applicable to proportionally actuatable electromagnetic valves, closed in their basic position, so that the invention disclosed, as a consequence, can also be applied to the outlet valve 7 illustrated in FIG. 1.

The invention claimed is:

1. Electromagnetic valve, in particular for wheel slip control systems of motor vehicles, comprising:
a valve housing in which a valve closure member is movably guided, a magnet armature that performs a stroke movement in the direction of a magnet core arranged in the valve housing for the proportional actuation of the valve closure member in response to the electromagnetic energization of a valve coil fitted to the valve housing, and a spring positioning the magnet armature at a defined axial distance from the magnet core in the electromagnetically non-energized valve position so that the magnet armature is isolated from the magnet core by a space, wherein the valve coil can be actuated by an electric current in such a manner that the valve closure member, beyond the proportional actuation, impinges upon the valve seat with a defined impulse force, wherein in time intervals when the fluid pressure at the valve closure member is at a minimum, a current is applied to the valve coil which makes the valve closure member impinge with the maximum stroke and the maximum speed upon the valve seat until the sediments sticking to the valve seat and/or the valve closure member are detached.

2. Electromagnetic valve as claimed in claim 1, wherein the power of the electric current is rated so that the valve closure member performs its maximum stroke for impinging upon the valve seat.

3. Electromagnetic valve as claimed in claim 1, wherein for removing contaminants deposited at the valve seat and/or at the valve closure member, the power of the electric current is variably adjustable in response to the degree of contamination.

4. Electromagnetic valve as claimed in claim 1, wherein in time intervals when proportional valve actuation does not take place, a current is applied to the valve coil, said current making the valve closure member impinge with a defined impulse force continuously or discontinuously upon the valve seat in order to remove sediments from the valve seat and/or the valve closure member.

5. Electromagnetic valve as claimed in claim 1, wherein for rinsing detached sediments out of the area of the valve seat and/or the valve closure member in times when the fluid pressure is at a maximum, the valve closure member has assumed a position in which it releases the maximum opening cross-section of the valve.

6. Electromagnetic valve as claimed in claim 1, wherein depending on a valve leakage that occurs in the valve's closed position, the valve coil is actuated by means of an impulse force detaching the sediments at the valve seat and/or at the valve closure member.

7. Electromagnetic valve as claimed in claim 6, wherein for detecting the valve leakage between the valve seat and the valve closure member, a means is provided measuring in the closed valve position the pressure of the fluid upstream and downstream of the valve closure member.

8. Electromagnetic valve as claimed in claim 7, wherein for detecting the pressure, in particular a pressure change representative of the valve leakage, pressure sensors are arranged upstream and downstream of the valve closure member, said sensors being connected to an electronic controller for the purpose of evaluating the pressure sensor signals representative of the pressure variation at the valve closure member, said controller actuating the valve coil and including an evaluating circuit.

9. Electromagnetic valve as claimed in claim 8, wherein for representing the hydraulic pressure change prevailing at the valve closure member in the closed valve position, a performance characteristics for a pressure model is stored in the electronic controller, comprising the pressure difference compared to the nominal pressure that is necessary for an inadmissible pressure change.

* * * * *